US009146571B2

United States Patent
Trautmann

(10) Patent No.: US 9,146,571 B2
(45) Date of Patent: Sep. 29, 2015

(54) POWER CONVERTER WITH AVERAGE CURRENT LIMITING

(71) Applicant: ZENTRUM MIKROELEKTRONIK DRESDEN AG, Dresden (DE)

(72) Inventor: Frank Trautmann, Munich (DE)

(73) Assignee: ZENTRUM MIKROELEKTRONIK DRESDEN AG, Dresden (DE)

( * ) Notice: Subject to any disclaimer, the term of this patent is extended or adjusted under 35 U.S.C. 154(b) by 124 days.

(21) Appl. No.: 13/847,005

(22) Filed: Mar. 19, 2013

(65) Prior Publication Data

US 2013/0241513 A1 Sep. 19, 2013

(30) Foreign Application Priority Data

Mar. 19, 2012 (EP) ..................................... 12160180

(51) Int. Cl.
  G05F 1/618 (2006.01)
  H02M 3/157 (2006.01)
  H02M 3/158 (2006.01)
  H02M 1/00 (2007.01)

(52) U.S. Cl.
  CPC .............. *G05F 1/618* (2013.01); *H02M 3/157* (2013.01); *H02M 3/1588* (2013.01); *H02M 2001/0025* (2013.01); *Y02B 70/1466* (2013.01)

(58) Field of Classification Search
  CPC ................ G05F 1/618; H02M 3/1588; H02M 2003/1566; Y02B 70/1466
  USPC .................................. 323/283, 285; 257/531
  See application file for complete search history.

(56) References Cited

U.S. PATENT DOCUMENTS

| 8,487,600 | B2 * | 7/2013 | Prodic et al. ................... 323/283 |
| 2003/0197245 | A1 * | 10/2003 | Zhang ............................ 257/531 |
| 2005/0168198 | A1 | 8/2005 | Maksimovic et al. |
| 2007/0114985 | A1 | 5/2007 | Latham et al. |
| 2008/0252280 | A1 | 10/2008 | Prodic et al. |
| 2008/0258701 | A1 | 10/2008 | Liu et al. |

FOREIGN PATENT DOCUMENTS

TW 595077 B 6/2004

OTHER PUBLICATIONS

Lee, Cheung Fai et al., A Monolithic Current-Mode CMOS DC-DC Converter With On-Chip Current-Sensing Technique, IEEE Journal of Solid-State Circuits, vol. 39, No. 1, Jan. 2004, 12 pages.
(Continued)

*Primary Examiner* — Adolf Berhane
*Assistant Examiner* — Yemane Mehari
(74) *Attorney, Agent, or Firm* — Heslin Rothenberg Farley & Mesiti P.C.

(57) ABSTRACT

In a control method for a buck power converter, an output voltage is generated according to a pulse width modulation signal and an input voltage; an error signal is generated by sampling the output voltage and differencing the sampled output voltage and an output voltage reference; a duty ratio that defines a duty cycle of a pulse width modulation signal is determined by a control law; the pulse width modulation signal is generated by providing the duty ratio to a digital pulse width modulator; a steady state or a load transient is detected; and an average inductor current is monitored and a difference between the average inductor current and a specific inductor current limit is accumulated in order to generate an offset value which is subtracted from the output voltage reference.

15 Claims, 5 Drawing Sheets

(56) References Cited

OTHER PUBLICATIONS

Kim, Hyo-Jae et al., Design of Deadbeat Current Mode Control Using Small Signal Model, Journal from Conference on Power Electronics, Jul. 2004, 4 pages.

Office Action dated May 8, 2014 issued in corresponding Korean patent application No. 10-2013-0029090.
European Search Report for Priority Application No. EP 12160180.1, dated Mar. 13, 2013.
Office Action issued in corresponding Taiwanese patent application No. 102109504 dated Nov. 14, 2014.

* cited by examiner

POWER CONVERTER WITH AVERAGE CURRENT LIMITING

CROSS REFERENCE TO RELATED APPLICATIONS

This application claims priority of European application no. 12160180.1 filed Mar. 19, 2012, the entire contents of which is hereby incorporated by reference herein.

TECHNICAL FIELD

The present invention relates a method for operating a pulse width modulation power converter. The present invention specifically relates to a power converter with average current limiting.

BACKGROUND ART

A switching regulator is a circuit that uses a power switch, an inductor, and a diode to transfer energy from input to output. In contrast to linear regulators that use a resistive voltage drop to regulate the voltage and lose power in the form of heat a switching regulator does not have a voltage drop and an associated current but instead the current is 90 degree out of phase with the voltage. Due to this, the energy is stored and can be recovered in the discharge phase of the switching cycle. In the art several types of switching regulators exist dependent on how the switching circuit is arranged, for example step-down (buck), step-up (boost) or inverter (flyback). The switch can be controlled by a PWM signal with duty ratio D that represents the on state during a PWM period. The output voltage is dependent on the duty ratio D and, hence, can be controlled by a controller which consists of an analog-to-digital-converter (ADC), a discrete-time control law, and a digital PWM (DPWM) module. The ADC samples and quantizes the regulated signal, the output voltage error that is the difference between the output voltage and an output voltage reference. The control law computes the digital duty ratio command D based on the quantized output voltage error. The control law is a given by a PID control law which is configured by a set of PID coefficients, the set comprising the proportional gain Kp, the integral gain Ki and the differential gain Kd and the time delay Td. The digital PWM modulator takes D as input, and outputs a PWM waveform with the commanded duty ratio D at a switching frequency. The PWM waveform has finite time resolution. The sensing and the quantization of other signals such as the load can be added depending on the application and the specific control law used.

In case a load transient occurs, for example if the output load is reduced leading to an output increase from level A to level B, the duty ratio of the PWM signal has to be increased for a short period of time until the average inductor current has reached the new level B. Once, the average inductor current has reached the new level B, the PWM duty ratio can be reduced again to a slightly higher value.

DISCLOSURE OF THE INVENTION

It is therefore an objective of the present invention to provide a method for operating a pulse width modulation power converter that leads to a superior response to load transients over the prior art. It is specifically an objective of the present invention to provide a method for operating a pulse width modulation converter that limits the average inductor current.

Throughout this document the following notation will be used:

| | |
|---|---|
| duty ratio | D |
| duty ratio difference | dD |
| nominal duty ratio | Nominal_D |
| actual duty ratio | Actual_D |
| actual duty ratio change | Actual_dD |
| allowed duty ratio change | Allowed_dD |
| inductor current averaged over one PWM switching cycle | IAVG |
| change of average inductor current | dIAVG |
| maximum inductor current change | dIAVGmax |
| inductance | L |
| input voltage | VIN |
| output voltage | VOUT |
| output current | IOUT |
| reference output voltage | VREF |
| digital equivalent to 100% duty cycle | DPWM_Resolution_Inv |
| period of one PWM switching cycle | Tsw |
| frequency of one PWM switching cycle | Fsw = 1/Tsw |

The present invention relates to a control method for a buck power converter wherein an output voltage is generated according to a pulse width modulation signal and an input voltage;

an error signal is generated by sampling the output voltage and differencing the sampled output voltage and an output voltage reference;

a duty ratio that defines a duty cycle of a pulse width modulation signal is determined by a control law;

the pulse width modulation signal is generated by providing the duty ratio to a digital pulse width modulator; and a steady state or a load transient is detected.

Further, an average inductor current is monitored and a difference between the average inductor current and a specific inductor current limit is accumulated in order to generate an offset value which is subtracted from the output voltage reference.

Hence, the average inductor current is limited by reduction of the output voltage via reduction of the output voltage reference.

The control loop is always closed. It can continuously operate in limiting state.

Preferably, the offset value is limited by a lower saturation limit such that the offset value cannot be negative.

Preferably, the difference between the average inductor current and a specific inductor current limit is multiplied by an inductor current gain factor.

However, the excessive current needs to be present first to be detected. The reference voltage can only be reduced with a specific slew rate determined by power stage, compensator and reference DAC that sets the output voltage reference.

One aspect of the present relates to a predictive limitation of the PWM duty ratio which is fast as this concept is predictive and the excessive current is prevent up-front.

Predictive limitation of PWM duty cycle may be implemented in that the duty ratio is monitored and subtracted from a nominal duty ratio in order to generate an actual duty ratio change:

$$Actual\_dD = D - Nominal\_D;$$

wherein a maximum inductor current change is computed by subtracting an inductor current limit from the average inductor current:

$$dIAVGmax = I\_LIMIT\_LEVEL - IAVG;$$

wherein an allowed duty ratio change is computed in dependence of the maximum inductor current change; and wherein in case the actual duty ratio change exceeds the allowed duty ratio change only an allowed duty ratio which is the sum of the nominal duty ratio and the allowed duty ratio change is provided to the digital pulse width modulator.

Preferably, the nominal duty ratio Nominal_D is computed by multiplying the digital equivalent to 100% duty cycle DPWM_Resolution_Inv with a ratio of the output voltage VOUT and input voltage VIN:

$$\text{Nominal}\_D = \text{VOUT}/\text{VIN} * \text{DPWM\_Resolution\_Inv}$$

Preferably, the allowed duty ratio change Allowed_dD is computed by generating the product of the maximum inductor current change dIAVGmax, the inductance L, the frequency of one switching period Fsw, the inverse of the difference of the input voltage VIN and the output voltage VOUT and the digital equivalent to 100% duty cycle DPWM_Resolution_Inv:

$$\text{Allowed } dD = dIAVGmax * L/(Tsw*(\text{VIN}-\text{VOUT})) * \text{DPWM\_Resolution\_Inv}$$

In contrast to sole predictive limitation of PWM duty ratio where the control loop is broken while the duty ratio is shortened by the limiting scheme as continuous operation in limiting state would lead to integrator wind-up of the compensator the combination with current limiting by output voltage reduction via output voltage reference reduction forming a hybrid solution utilizes the advantages of each technique for an optimized solution Preferably, in case the actual duty ratio change exceeds the allowed duty ratio change the difference between the duty ratio and the allowed duty ratio is additionally accumulated in order to generate the offset value.

Preferably, the difference between duty ratio and the allowed duty ratio is multiplied by a duty ratio gain factor.

The present invention relates further to a pulse width modulation power converter, comprising:
an output stage generating an output voltage according to a pulse width modulation signal and an input voltage by means of a switching element,
means for providing an output voltage reference,
an analog digital converter connected to the output stage and the means for providing an output voltage reference, sampling and amplifying a difference between the output voltage and the output voltage reference to generate an error signal,
a controller connected to the analog digital converter and the switching element for determining a duty ratio for a digital pulse width modulator that generates the pulse width modulation signal,
wherein the pulse width modulation converter further comprises means for monitoring an average inductor current; means for accumulating the difference between the average inductor current and a specific inductor current limit in order to generate an offset value and means for subtracting the offset value from the output voltage reference.

Preferably, the PWM power converter further comprises means for computing the difference between the average inductor current and a specific inductor current limit and means for multiplying said difference by an inductor current gain factor.

Preferably, the PWM power converter further comprises means for monitoring the duty ratio; means for subtracting the duty ratio from a nominal duty ratio in order to generate an actual duty ratio change and means for subtracting and storing an inductor current limit from the average inductor current in order to generate the maximum inductor current change; means for computing an allowed duty ratio change in dependence of the maximum inductor current change; and means for comparing the actual duty ratio change with the allowed duty ratio change wherein such means are configured such that in case the actual duty ratio change exceeds the allowed duty ratio change only an allowed duty ratio which is the sum of the nominal duty ratio and the allowed duty ratio change is provided to the digital pulse width modulator.

Preferably, the PWM power converter further comprises means for multiplying the digital equivalent to 100% duty cycle with a ratio of the output voltage and input voltage in order to compute the nominal duty ratio.

Preferably, the PWM power converter further comprises means for computing the allowed duty cycle change by generating the product of the maximum inductor current change, the inductance, the frequency of one switching cycle Fsw, the inverse of the difference of the input voltage and the output voltage, and the digital equivalent to 100% duty cycle.

Preferably, the PWM power converter comprises means for comparing the difference between the duty ratio and the nominal duty ratio with the allowed duty ratio change and wherein the integrator is configured such that in case the actual duty ratio change exceeds the allowed duty ratio change the difference between the duty ratio and the allowed duty ratio is additionally accumulated in order to generate the offset value.

Preferably, the PWM power converter further comprises means for storing a duty ratio gain factor and means for multiplying the duty ratio gain factor with the difference between duty ratio and the allowed duty ratio.

BRIEF DESCRIPTION OF THE DRAWINGS

The apparatus and method according to the invention are described in more detail herein below by way of exemplary embodiments and with reference to the attached drawings, in which.

EMBODIMENT OF THE INVENTION

Figure 1:
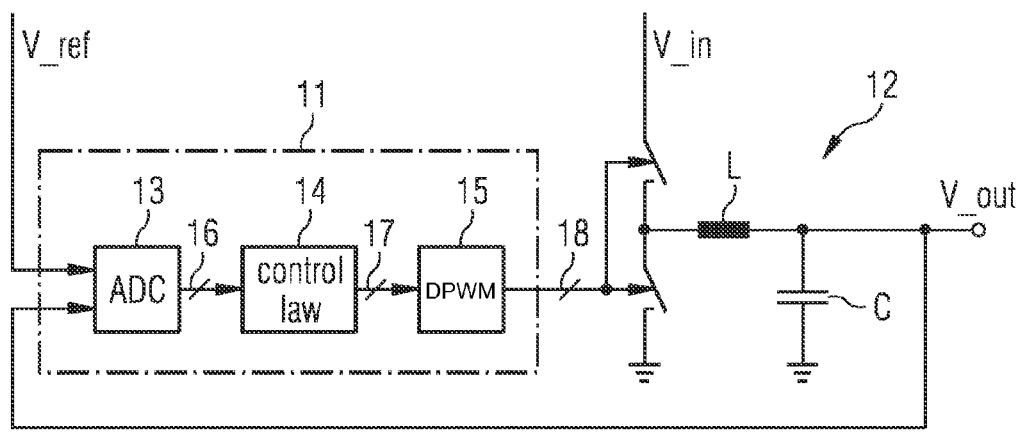
FIG. 1 shows a block diagram of a PWM buck converter.

One embodiment of the present invention is a buck converter as shown in FIG. 1. The buck converter consists of a digital controller 11 and a power train 12. The digital controller comprises an ADC 13, the control law 14 and the digital PWM modulator 15. An error signal 16 is computed by differencing the output reference voltage V_ref and the output voltage V_out. The control law takes the error signal 16 as input and outputs the duty command ratio 17. The duty command ratio 17 controls the PWM modulator which generates a switching frequency 18. Switching frequency 18 and input voltage V_in drive the power train which outputs the output voltage V_out.

Figure 2:
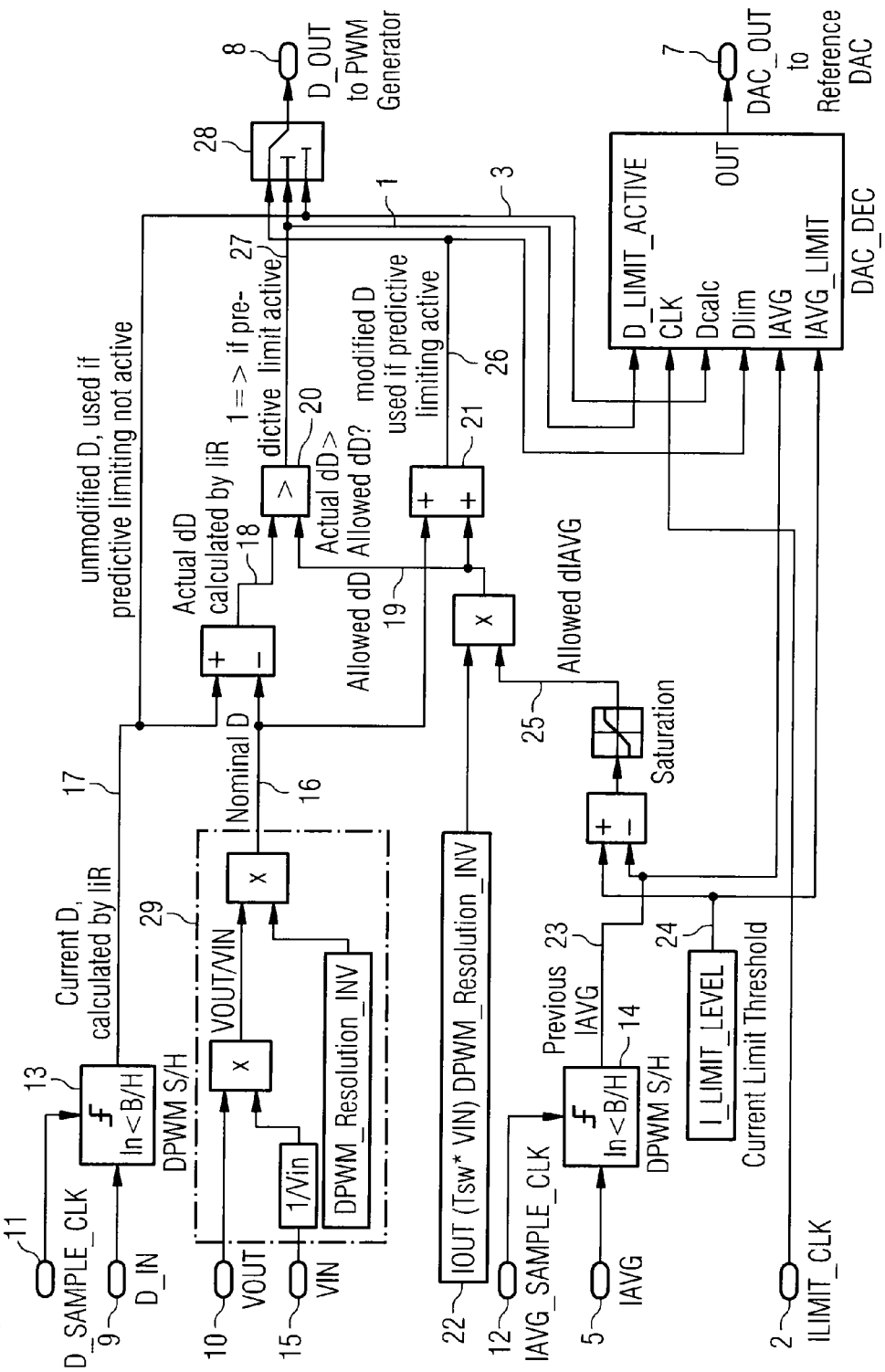
FIG. 2 shows a block diagram of the reference voltage reduction aspect.
Figure 3:
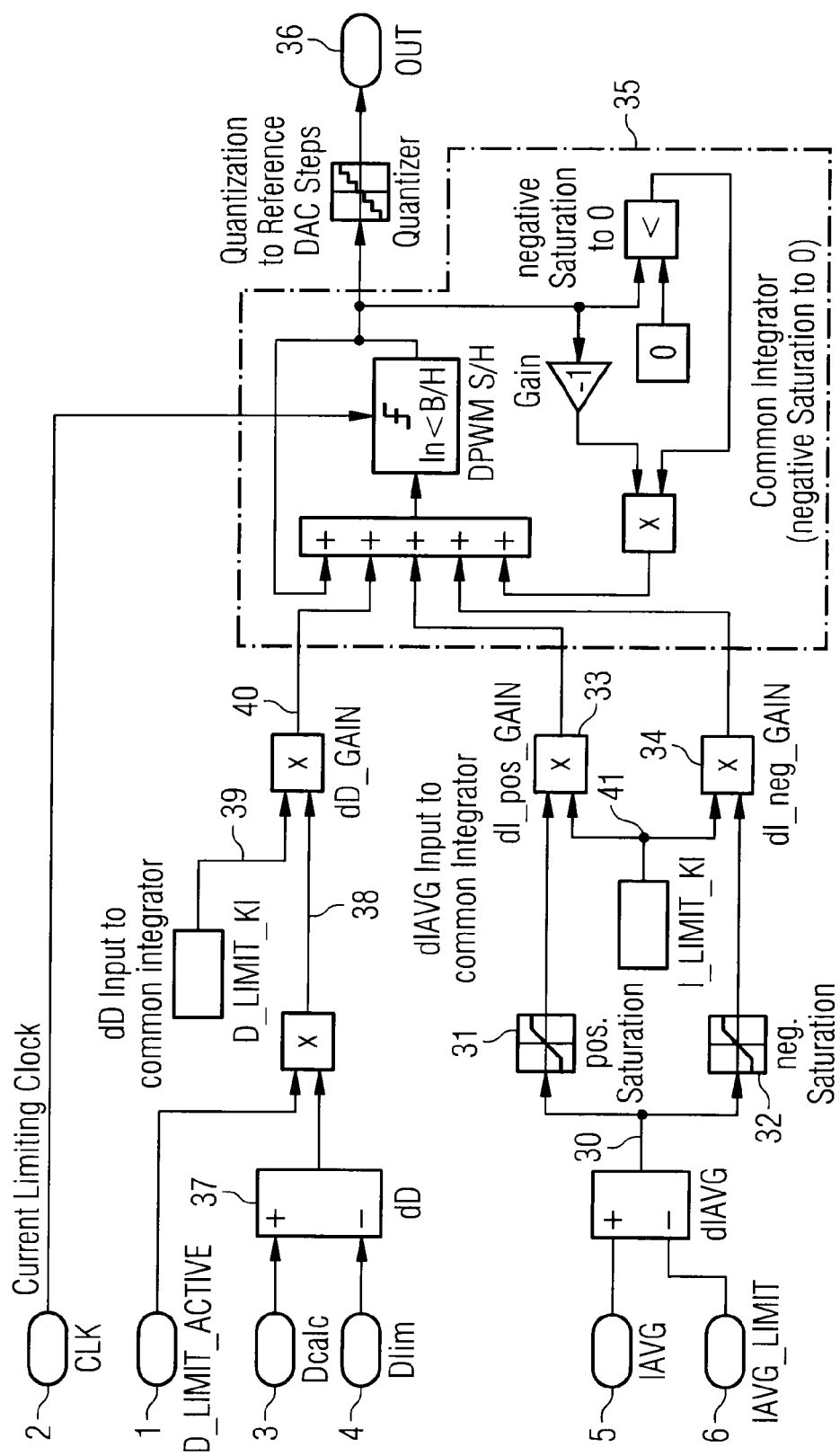
FIG. 3 shows a block diagram of the predictive PWM duty cycle limitation aspect.

In this embodiment a predictive duty cycle limiting subsystem as shown in FIG. 2 is combined with a reference DAC control subsystem as shown in FIG. 3.

The sub-system monitors the inductor current averaged over one PWM switching cycle which is in steady state equal to the output current IAVG and the PWM duty ratio D, calculated by the compensator.

Both inputs D 9 and IAVG 5 are sampled with a specific sample clock, D_SAMPLE_CLOCK 11 and IAVG_SAMPLE_CLOCK 12, respectively.

In addition, the output voltage VOUT 10 and the input voltage of the buck converter VIN 15 are inputs to this subsystem.

The duty ratio increase Actual_dD 18, requested by the compensator for an IAVG change is calculated by subtracting the current D 17 in the compensator from the nominal duty ratio Nominal_D 16. Nominal_D 16 is calculated via Nominal_D=VOUT/VIN*DPWM_Resolution_Inv, see dashed lined block.

Thus, the actual duty ratio change Actual_dD 18 is

Actual_dD18=D17−Nominal_D16=D−VOUT/ VIN*DPWM_Resolution_Inv

The maximum allowed dD 19 for a maximum IAVG change 25 from an IOUT level to IOUT limit I_LIMIT_LEVEL 24 is calculated as follows:

dIAVGmax 25=I_LIMIT_LEVEL24−IAVG 23

AlloweddD19=dIAVGmax 25*(L/(Tsw*(VIN− VOUT))*DPWM_Resolution_Inv)22

If the Actual_dD 18 is greater than the Allowed_dD 19, only the Allowed_D (Nominal D 16+Allowed_dD 19) is forwarded to the PWM generator (D_OUT 8) via switch 28.

The reference DAC control sub-system, FIG. 3 is centered around an integrator 35. It generates an offset value Out 36 which is subtracted from the nominal reference DAC input value in order to reduce the reference voltage for current limiting. The integrator has a lower saturation limit at 0, thus the offset value cannot be negative. The integrator 35 accumulates the inputs from two input sources.

One input is the difference 30 between the specific current limit IAVG_LIMIT 6 and the actually sensed average inductor current IAVG 5.

dIAVG=IAVG−IAVG_LIMIT

A programmable coefficient I_LIMIT_KI 41 is used to apply a specific gain factor to dIAVG.30

The second integrator input is the difference between the duty ratio calculated by the compensator Dcalc 3 and the potentially limited duty ratio as generated by the predictive duty ratio limiting sub-system Dlimit 4.

dD40=Dcalc3−Dlimit4 dD is gated by the D_LIMIT_ACTIVE input, i.e. dD is not equal 0, if D_LIMIT_ACTIVE==1, i.e. if the duty ratio to the PWM generator is actively limited by the predictive duty ratio limiting sub-system.

A programmable coefficient D_LIMIT_KI 39 is used to apply a specific gain factor to dD 40.

In this section the operation of the overall system is described by means of two different load change scenarios.

Slow load changes, i.e. slow increases of the output current beyond the current limit, cause rather small duty ratio increments Actual_dD. Thus, the Actual_dD will most like be smaller than the Allowed_dD and therefore the predictive duty ratio limiting sub-system will not modify the duty ratio value sent to the digital PWM modulator. Also the dD input to the integrator of the reference DAC control sub-system will be 0. However, as soon as the actual average inductor current IAVG exceeds the current limit IAVG_LIMIT the dIAVG*I_LIMIT_KI will be accumulated by the integrator and will cause a reduction of the output voltage until IAVG is equal to IAVG_LIMIT_dIAVG=0.

Fast load changes, i.e. fast increases of the output current beyond the current limit, cause relatively large duty ratio steps. Thus, the Actual_dD requested by the compensator will most likely be greater than the Allowed_dD for the present steady-state output current level.

Therefore, the duty ratio value to the PWM generator will be limited to the Allowed_D value, causing that the inductor current cannot increase beyond the limit during the load transient response. However, the limitation of D also causes that the control loop is not intact anymore.

While the predictive duty ratio limiting sub-system is actively limiting the duty ratio the dD input of the integrator of the reference DAC control sub-system is greater than 0 and thus the reference voltage gets reduced. A reduced reference voltage causes a reduction of the requested duty ratio from the compensator until the duty ratio does not need to be limited anymore.

At the same time, the integrator input based on dIAVG is active and contributes to the reference DAC control to make sure the sensed average inductor current stays below the current limit also after the predictive duty ratio limiting sub-system has become inactive again when the new steady-state condition has been reached.

Figure 4:
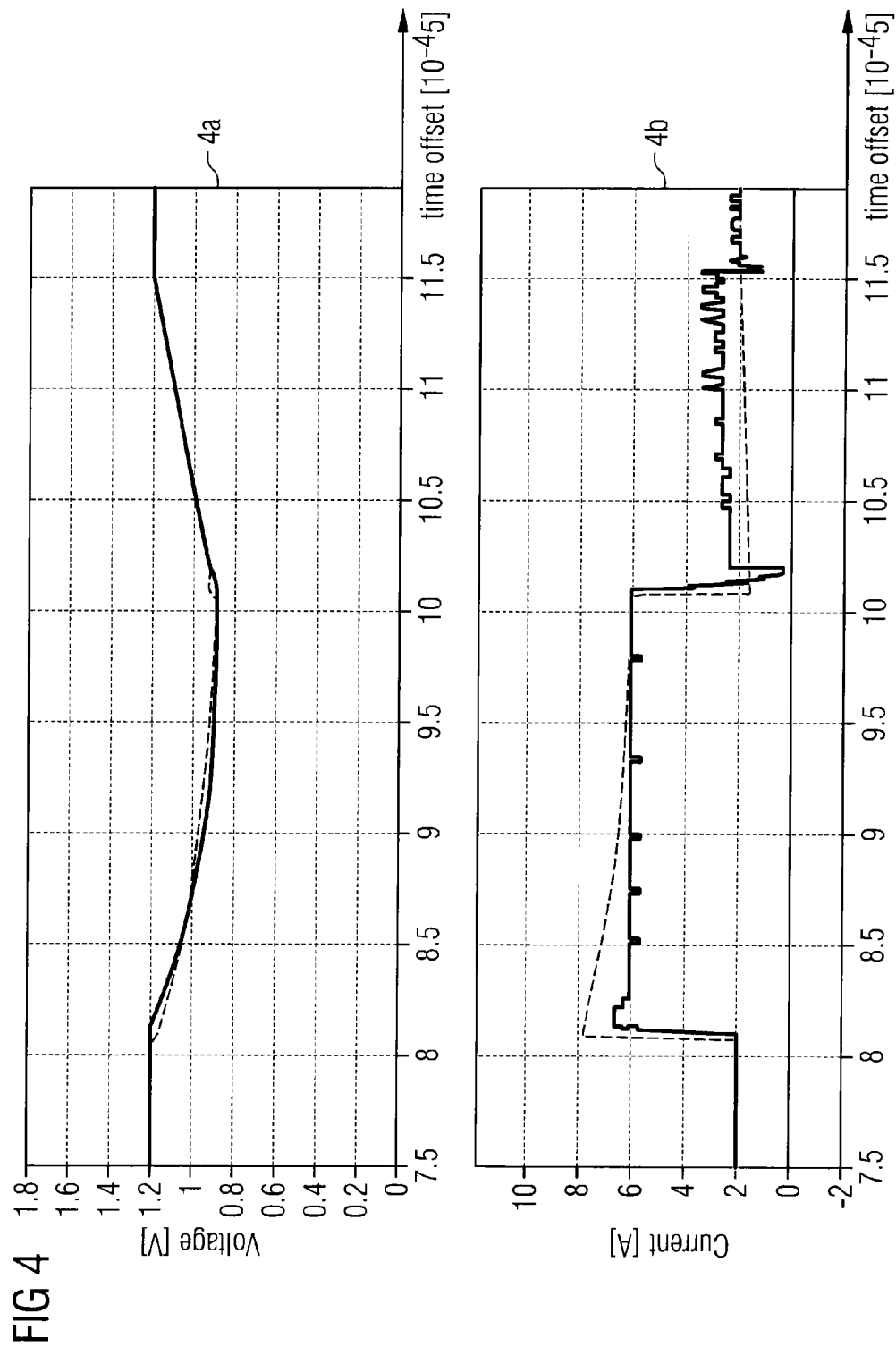
FIG. 4 shows a simulation plot to demonstrate how the proposed average current limiting circuit works.

FIG. 4 shows the result of a simulation to see the behavior of the described system in response to a load step at the output current (dotted line, FIG. 4b) from 2 A to 8 A. The average current limit is set to 6 A. Without a current limit the average inductor current would increase above 8 A and would settle at 8 A. As can be seen now, the inductor current (solid line, FIG. 4b) goes slightly above 6 A and settles at 6 A. The output current is following the inductor current because of the output voltage decrease, see FIG. 4a, which is induced by the reference DAC control subsystem. After the current step both voltages VOUT (dotted line, FIG. 4a) and VREF (solid line, FIG. 4a) are decreasing. In the first section while VOUT and VREF differ, the predictive duty cycle limiting subsystem is active which opens the feedback loop. At the point where both curves converge the feedback loop is again in operation. At the point where the output current is set back to the starting value the feedback system regulates the output voltage back to the nominal value.

Figure 5:
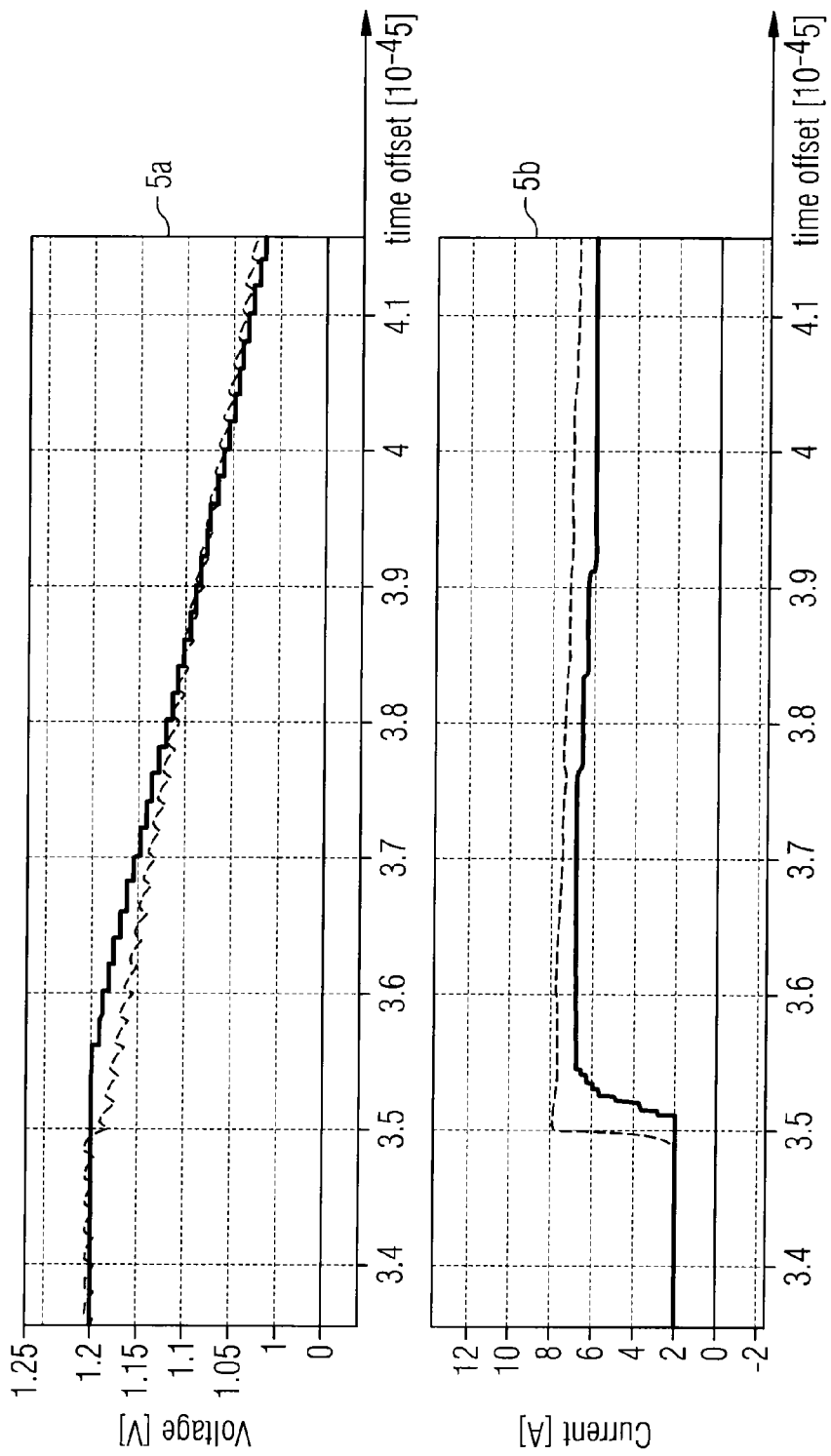
FIG. 5 shows the same as FIG. 4 in a zoomed view.

FIG. 5 shows the start of the limiting scenario in a zoomed view. VOUT is the dotted line of FIG. 5a; VREF the solid line of FIG. 5a; the output current is the dotted line of FIG. 5b; and the inductor current is the solid line of FIG. 5b.

While the present invention has been illustrated and described in detail in the drawings and foregoing description, such illustration and description are to be considered illustrative or exemplary and not restrictive. It will be understood that changes and modifications may be made by those of ordinary skill within the scope and spirit of the following claims.

The invention claimed is:

1. A control method for a buck power converter having a power train including a single inductor, comprising:
   generating an output voltage from the power train according to a pulse width modulation signal and an input voltage;
   generating an error signal by sampling the output voltage and differencing the sampled output voltage and an output voltage reference;
   determining a duty ratio that defines a duty cycle of a pulse width modulation signal by a control law;
   generating the pulse width modulation signal by providing the duty ratio to a digital pulse width modulator;
   detecting a steady state or a load transient; and
   monitoring an average inductor current of the single inductor, accumulating a difference between the average inductor current and a specific inductor current limit in order to generate an offset value, and subtracting the offset value from the output voltage reference to limit the average inductor current.

2. The control method according to claim 1, wherein the offset value is limited by a lower saturation limit such that the offset value cannot be negative.

3. The control method according to claim 2, wherein the difference between the average inductor current and a specific inductor current limit is multiplied by an inductor current gain factor.

4. The control method according to claim 1, wherein the duty ratio is monitored and subtracted from a nominal duty ratio in order to generate an actual ratio cycle change;
wherein a maximum inductor current change is computed by subtracting an inductor current limit from the average inductor current;
wherein an allowed duty ratio change is computed in dependence of the maximum inductor current change; and
wherein in case the actual duty ratio change exceeds the allowed duty ratio change only an allowed duty ratio which is a sum of the nominal duty ratio and the allowed duty ratio change is provided to the digital pulse width modulator.

5. The control method according to claim 4, wherein the nominal duty ratio is computed by multiplying a digital equivalent to 100% duty cycle with a ratio of the output voltage and the input voltage.

6. The control method according to claim 4, wherein the allowed duty ratio change is computed by generating product of the maximum inductor current change, inductance, frequency of one switching cycle, inverse of a difference of the input voltage and the output voltage, and a digital equivalent to 100% duty cycle.

7. The control method according to claim 4, wherein in case the actual duty ratio change exceeds the allowed duty ratio change a difference between the duty ratio and the allowed duty ratio is additionally accumulated in order to generate the offset value.

8. The control method according to claim 7, wherein the difference between duty ratio and the allowed duty ratio is multiplied by a duty ratio gain factor.

9. A pulse width modulation power converter, comprising:
an output stage, including a single inductor, generating an output voltage according to a pulse width modulation signal and an input voltage by a switching element,
means for providing an output voltage reference,
an analog digital converter connected to the output stage and to the means for providing an output voltage reference, sampling and amplifying a difference between the output voltage and the output voltage reference to generate an error signal,
a controller connected to the analog digital converter and the switching element for determining a duty ratio according to said error signal,
a digital pulse width modulator that generates the pulse width modulation signal according to the duty ratio,
wherein the digital pulse width modulation converter further comprises:
means for monitoring an average inductor current of the single inductor; means for accumulating a difference between the average inductor current and a specific inductor current limit in order to generate an offset value and means for subtracting the offset value from the output voltage reference to limit the average inductor current.

10. The pulse width modulation converter according to claim 9, further comprising means for computing the difference between the average inductor current and a specific inductor current limit and means for multiplying said difference by an inductor current gain factor.

11. The pulse width modulation converter according to claim 9, further comprising means for monitoring the duty ratio; means for subtracting the duty ratio from a nominal duty ratio in order to generate an actual duty ratio change and means for storing and subtracting an inductor current limit from the average inductor current in order to generate a maximum inductor current change;
means for computing an allowed duty ratio change in dependence of the maximum inductor current change; and
means for comparing the actual duty ratio change with the allowed duty ratio change, configured such that in case the actual duty ratio change exceeds the allowed duty ratio change only an allowed duty ratio which is a sum of the nominal duty ratio and the allowed duty ratio change is provided to the digital pulse width modulator.

12. The pulse width modulation power converter according to claim 9, further comprising means for multiplying a digital equivalent to 100% duty cycle with a ratio of the output voltage and the input voltage in order to compute a nominal duty ratio.

13. The pulse width modulation power converter according to claim 12, further comprising means for computing an allowed duty ratio change by generating the product of the maximum inductor current change, inductance, frequency of one switching cycle, inverse of a difference of the input voltage and the output voltage, and the digital equivalent to 100% duty cycle.

14. The pulse width modulation power converter according to claim 11, further comprising means for comparing a difference between the duty ratio and a nominal duty ratio with the allowed duty ratio change and wherein the means for accumulating is configured such that in case the actual duty ratio change exceeds the allowed duty ratio change the difference between the duty ratio and the allowed duty ratio is additionally accumulated in order to generate the offset value.

15. The pulse width modulation power converter according to claim 14, further comprising means for storing a duty ratio gain factor and means for multiplying the duty ratio gain factor with the difference between duty ratio and the allowed duty ratio.

* * * * *

UNITED STATES PATENT AND TRADEMARK OFFICE
CERTIFICATE OF CORRECTION

PATENT NO.        : 9,146,571 B2
APPLICATION NO.   : 13/847005
DATED             : September 29, 2015
INVENTOR(S)       : Frank Trautmann It is certified that error appears in the above-identified patent and that said Letters Patent is hereby corrected as shown below:

On the title page item (72), Delete "Frank Trautmann, Munich (DE)" and insert -- Frank Trautmann, Munich (DE); Armin Stingl, Erdingen (DE) --

Signed and Sealed this
First Day of March, 2016

Michelle K. Lee
*Director of the United States Patent and Trademark Office*